E. H. HEBERN.
DIRECTION INDICATING DEVICE FOR VEHICLES.
APPLICATION FILED MAR. 16, 1915.

1,192,780. Patented July 25, 1916.

WITNESSES:
F. C. Fliedner
G. M. Ball

INVENTOR,
Edward H. Hebern,
BY Francis M. Wright
ATTORNEY

UNITED STATES PATENT OFFICE.

EDWARD H. HEBERN, OF OAKLAND, CALIFORNIA.

DIRECTION-INDICATING DEVICE FOR VEHICLES.

1,192,780.   Specification of Letters Patent.   Patented July 25, 1916.

Application filed March 16, 1915. Serial No. 14,763.

*To all whom it may concern:*

Be it known that I, EDWARD H. HEBERN, a citizen of the United States, residing at Oakland, in the county of Alameda and State of California, have invented new and useful Improvements in Direction-Indicating Devices for Vehicles, of which the following is a specification.

The object of the present invention is to provide a simple, economical and effective device for enabling the driver of a vehicle to indicate the direction in which he intends to direct the vehicle.

I have herein shown the invention as applied to a motor car, but it can be used for other vehicles.

Figure 1:
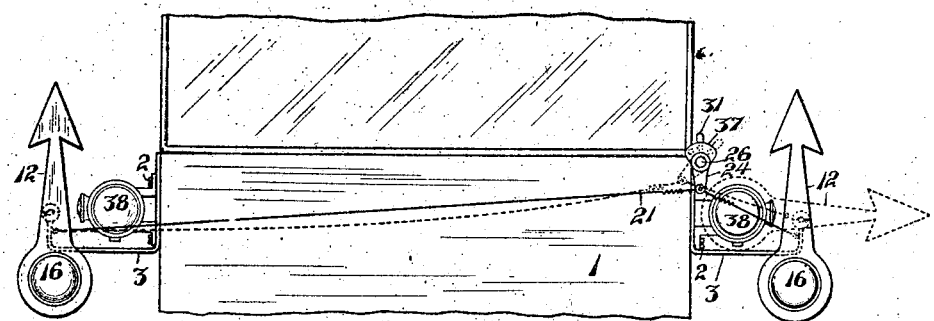
Figure 2:
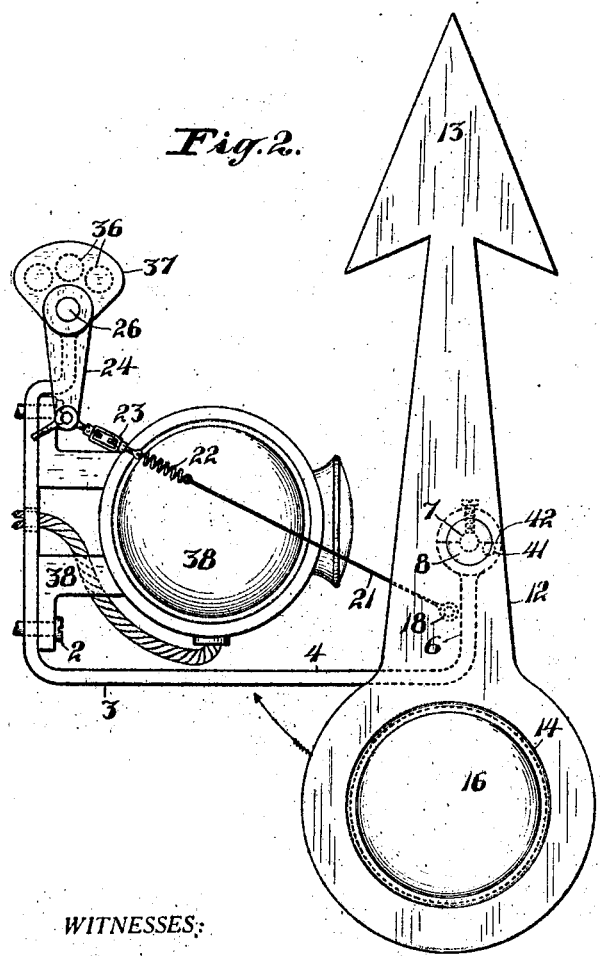
Figure 3:
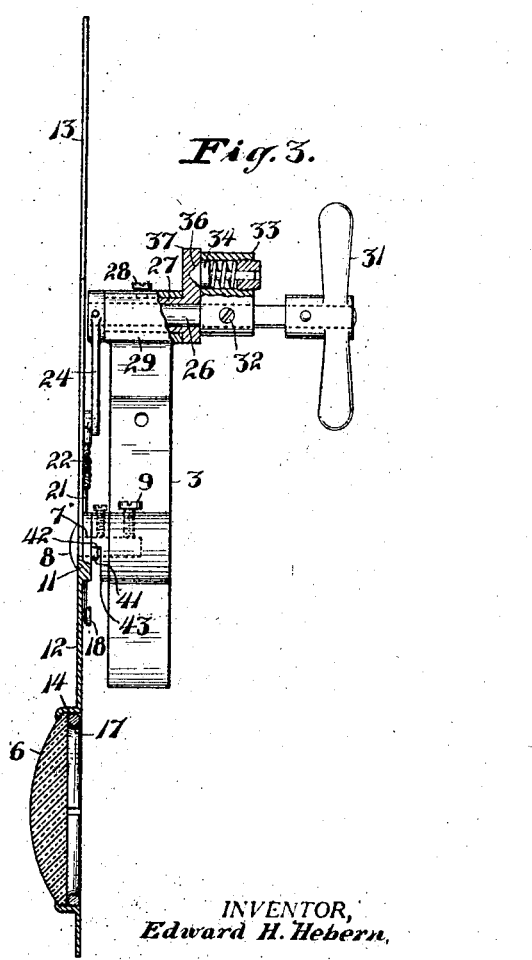

In the accompanying drawing, Figure 1 is a broken front view of a motor car to which my improved device is applied; Fig. 2 is an enlarged front view of a portion of the device; Fig. 3 is a side view of the same partly in section.

Referring to the drawing, 1 indicates the dashboard of a motor car, to each edge of which is secured by screws 2 a bracket 3, having a lower horizontally and outwardly extending arm 4, the enlarged outer end of which extends upwardly, as shown at 6. Said end 6 has a socket to receive a pivot 7 extending from a head 8, said pivot being secured in said socket by a set screw 9 screwed through said end. Between said end and head is pivoted on said pin a block 11, integral with which is an arm 12, having at one end, the upper one in its normal position, an arrow head 13, the other end being enlarged and apertured and formed with a flange 14, around said aperture, in which is received a red lens 16 held in place by a wire 17. To the back of said arm below its pivot is secured a stud 18, around which extends one end of a wire 21, connected at the other end to one end of a coiled spring 22, the other end of which is connected to one end of a turn-buckle 23, the other end of which is pivotally connected to the lower end of an arm 24, the upper end of which is secured to a shaft 26, rotatable in a sleeve 27, adjustably secured by a set screw 28 in a bearing 29 carried on the upper end of an outward extension of one of said brackets 3. To the rear end of said shaft is secured a handle 31, and to said shaft adjacent to said sleeve is secured, as shown at 32, a latch holder 33, carrying a spring latch 34, the point of which is adapted to enter any one of three recesses 36 in the rear surface of an upward extension 37 of said sleeve. To each bracket is also secured by means of screws a lamp frame 38 having a colorless lens. The center of the lens 16 is not directly beneath the pivot 7 on which the arm 12 swings, but to the inner side thereof, the lens being prevented from moving to a position in which its center is directly below said axis by a pin 41 extending rearwardly from said block 11 on the inner side of said pivot abutting against a flat surface 42 of a block 43 adjustably secured on said pivot. It results from this arrangement that the arm normally hangs in a position in which the center of the lens is on the inner side of the direct vertical line through the pivotal axis of the arm, in which position said arm is directed vertically.

The following is the mode of operation of my improved indicating device: If the driver is traveling straight ahead and does not intend to change his course, both arrows are directed vertically upward, and no light shows through the red lenses 16 and therefore they are invisible at night, the white lamps only being seen. But if the driver intends to turn, for instance to the left, he moves the handle 43 to the left, which thereby causes the arrow on the left side to be directed toward the left, and the lens 16 then assumes a position in front of the left-hand lamp 38, so that a red light is shown on the left, and a white light on the right. This indicates that the driver is turning to the left. The coiled springs are used for the following reason: In the day time the glare of the sun, if in a certain position relative to the motor car, often renders it difficult to see clearly the arrow heads or to know in which direction they are pointing. In order to overcome this difficulty the arrow heads are nickel-plated and they are caused to vibrate, when in a horizontal position, by the oscillation of the lenses 16 due to the motion of the car, and to the fact that they are held in the horizontal position, by means comprising a resilient member, namely, the coiled spring 22. It results from this oscillatory movement that the arrow head is very plainly visible in the sun light. In the vertical position of the arrow head, however, it does not oscillate on account of the pin 41 resting against the surface 42.

I claim:—

In a direction indicating device, brackets extending outwardly from the sides of a portion of the vehicle, arms rotatably secured on the outer ends of said brackets and having rearwardly extending pins, blocks between said arms and brackets having surfaces adapted to engage said pins and limit the swinging movement of the arms, said arms being formed at one end into arrow heads, and at the other end into lens holders, colored lenses held by said holders, on the inner side of the vertical lines through the pivots, a bearing carried by one of said brackets, a sleeve within said bearing, a shaft within said sleeve, an arm extending from one end of said shaft, resilient tying devices, adjustable as to length, connecting the outer end of said arm with the first-named arms below the pivots of the latter, an extension from said sleeve having recesses in its rear surface, a latch holder carried by said shaft, a spring-actuated latch carried by said holder and adapted to enter any one of said recesses, a handle carried by said shaft, and lamps carried by said brackets into registry with which said lenses can be swung.

In testimony whereof I have hereunto set my hand in the presence of two subscribing witnesses.

EDWARD H. HEBERN.

Witnesses:
FRANCIS M. WRIGHT,
D. B. RICHARDS.